United States Patent [19]

Warren

[11] 4,167,138

[45] Sep. 11, 1979

[54] CRACKING HEAD FOR AN EGG BREAKING MACHINE

[76] Inventor: William H. Warren, 649 Palm Cir. E., Naples, Fla. 33940

[21] Appl. No.: 849,040

[22] Filed: Nov. 7, 1977

[51] Int. Cl.² ............................................. A23B 4/04
[52] U.S. Cl. ...................................... 99/498; 426/299
[58] Field of Search .......... 99/498, 567, 568, 572–582; 426/299; 30/120.1–120.5

[56] References Cited

U.S. PATENT DOCUMENTS 3,589,419  6/1971  Classen .................................. 99/498

*Primary Examiner*—Leonard D. Christian

*Attorney, Agent, or Firm*—Holland, Armstrong, Wilkie & Previto

[57] ABSTRACT

An improved breaker head is disclosed for use on automatic egg breaking machines. These machines receive whole eggs from a conveyor or other egg feeder and crack, open and drain the eggs. This improved head has a cracking knife arrangement which engages the inner side portions of the egg shells. This facilitates egg drainage by permitting a more complete and a more rapid draining of the egg white, facilitates the yolk removal, and adjusts knife penetration in accordance with the egg size to protect yolks from knife damage in smaller eggs.

2 Claims, 6 Drawing Figures

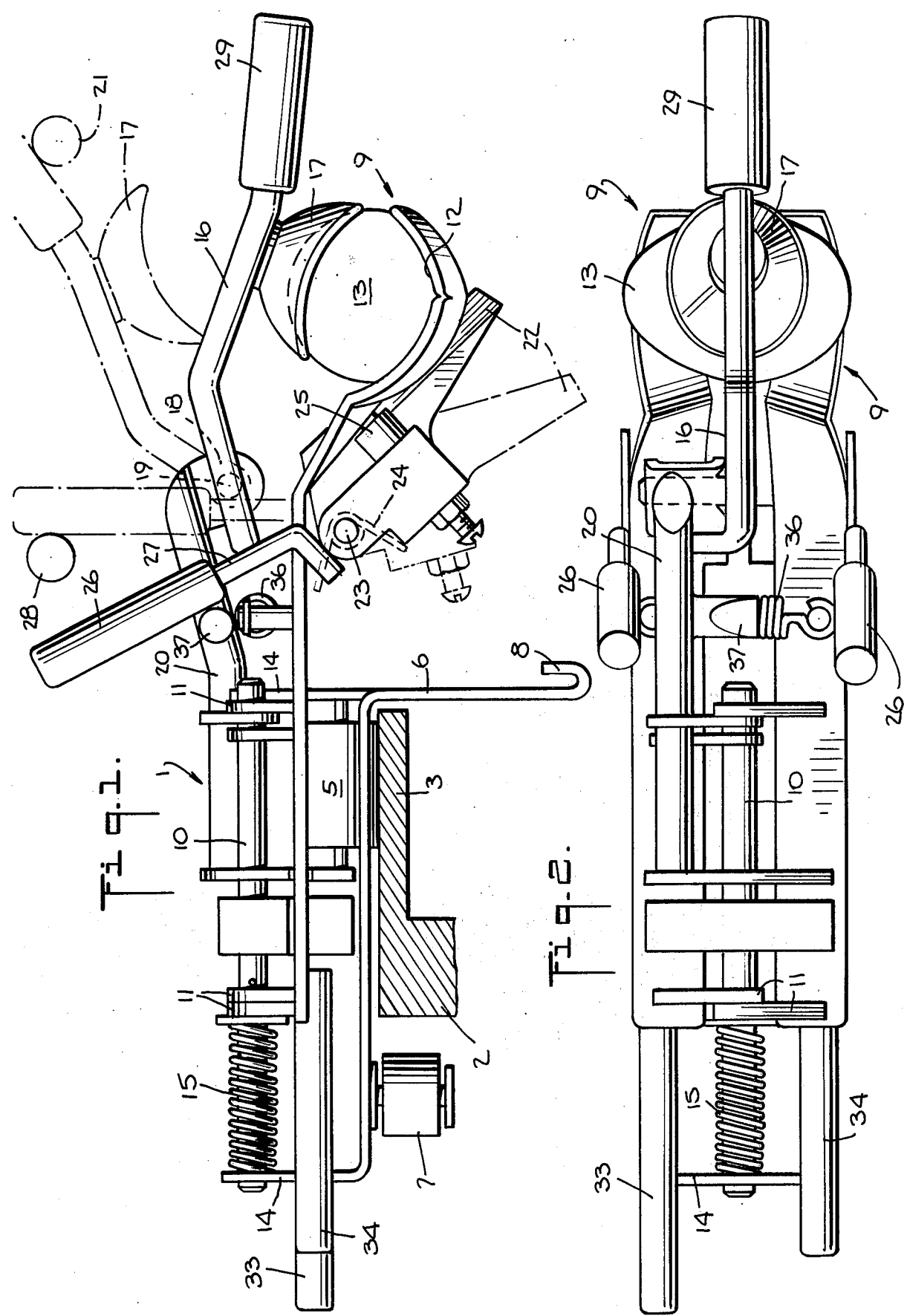

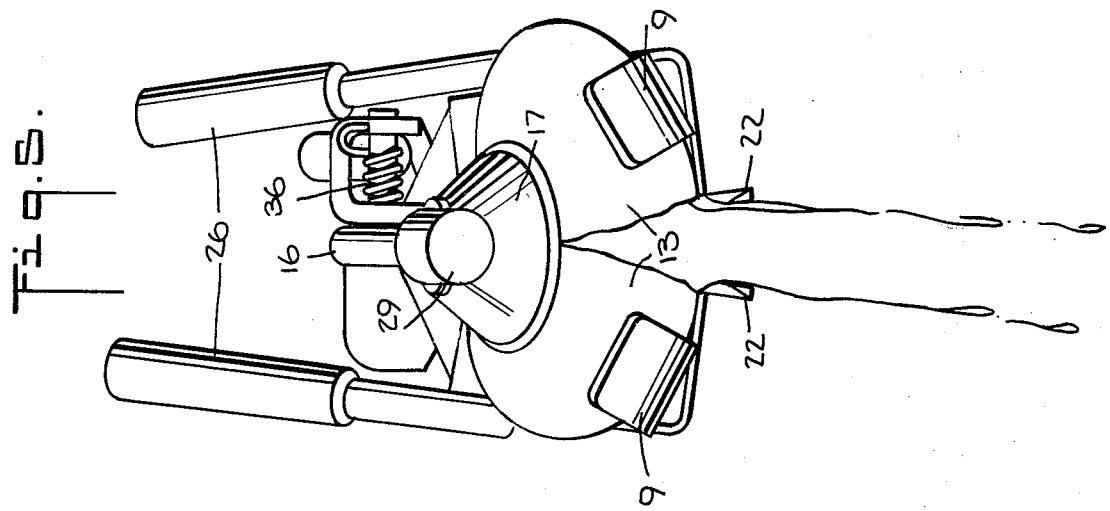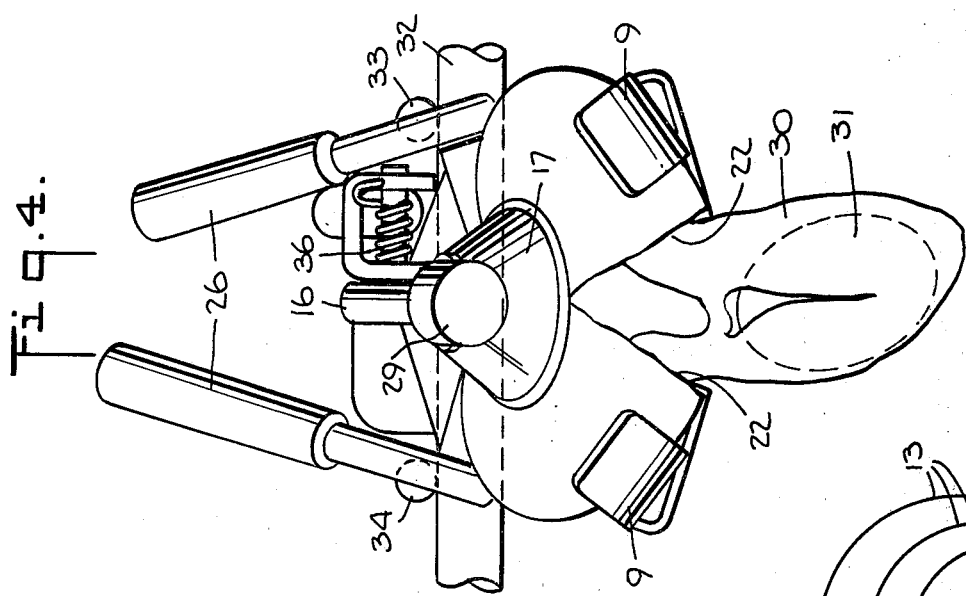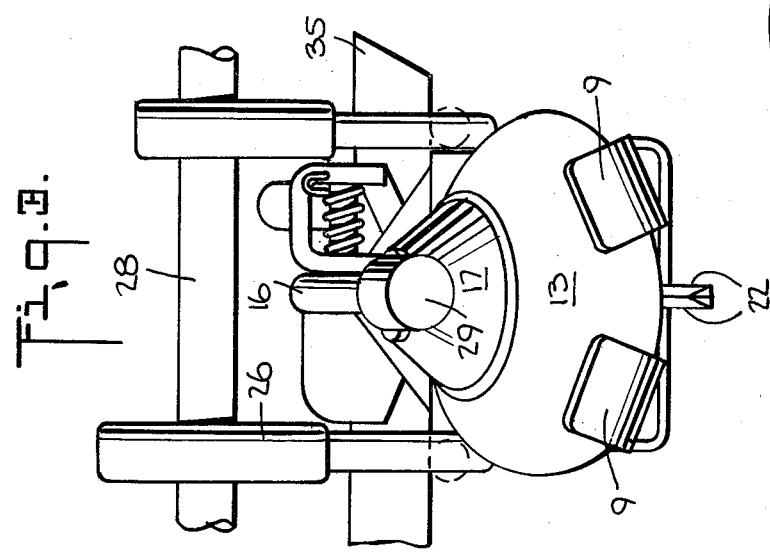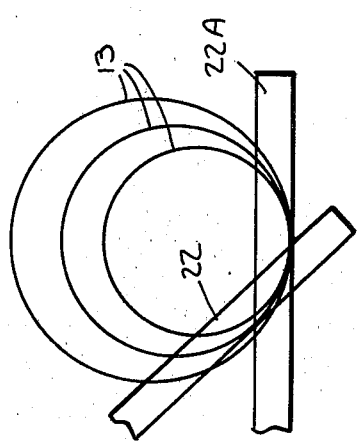

CRACKING HEAD FOR AN EGG BREAKING MACHINE

BACKGROUND OF THE INVENTION

The present invention relates to egg processing machines and methods and more particularly to an improved egg breaking head and egg breaking method for use on egg breaking machines. There are a variety of automatic egg breaking machines which, in most cases, include a number of individual and indentical egg breaking heads.

Such machines including the egg breaking heads as illustrated, for example, in U.S. Pat. Nos. 3,455,356 and 3,589,419, dated July 15, 1969 and June 29, 1971, respectively. These prior patents illustrate various supports for moving individual egg breaking heads to a loading position and thereafter through cracking, opening and draining positions so that the machine produces a liquid egg at product discharge lines. The above patents illustrate individual egg breaking heads which include cup-shaped or rounded egg support arms and egg clamps which receive and hold the eggs and cooperating knives which operate to crack the egg shells and assist in parting the egg halves for the draining and separation operation.

Prior separating heads use a pair of knives in each head which are mounted adjacent to one another so that one knife engages each of the halves of the egg shell during the egg opening after the egg cracking.

The presence of these prior knives has a useful function in egg shell retention, however, their positioning near or across the lowermost portions of the shell halves tend to dam and to restrict the liquid egg flow. This has now been found to result in an objectionable slow down in drainage particularly in improved breaking machines which are now being operated at higher and higher breaking speeds. This positioning has also been found to result in excess knife penetration in smaller eggs causing yolk drainage as well as knife interference during yolk removal.

Accordingly, an object of the present invention is to provide an egg breaking machine with improved egg cracking means.

Another object of the invention is to provide an egg breaking machine with an improved cracking head knife arrangement.

Another object of the invention is to provide an egg breaking machine with an improved egg cracking method and means.

Another object of the invention is to provide an improved egg cracking means adapted for handling differing size eggs.

Another object of the invention is to provide an egg cracking means for cracking eggs and draining them with a minimum possibility of yolk rupture.

Other and further objects of the invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a side elevational view of the improved egg cracking head in accordance with the invention.

FIG. 2 is a top plan view of the cracking head of FIG. 1.

FIGS. 3, 4 and 5 are end elevational views of the cracking head of FIG. 1 illustrating successive egg cracking and draining positions.

FIG. 6 is a diagrammatic view of relative egg and knife positions for differing egg sizes.

DESCRIPTION OF THE PREFERRED EMBODIMENT

As indicated above, the improvements of this invention are incorporated in the knife means for the cracking heads. It will be seen that these improvements can be utilized in cracking heads as used on a variety of overall egg breaking machine configurations. The improvements are particularly useful in egg breaking machines of the type described in the above referred to patents where the cracking heads are carried around closed horizontal paths at relatively high speeds. In these machines the eggs and their yolks and whites are subjected to outward centrifugal forces during portions of the cracking and draining operations.

These machines comprise bases with suitable support legs and a cracking head drive system or carrier such as a drive chain or turret. A typical machine utilizing cracking heads 1 may have a machine base 2 including a roller support rail 3 (FIG. 1) which provides a support and guide surface for individual rollers 5 provided for each of the cracking heads 1 on a cracking head mounting bracket 6.

As best illustrated in FIG. 1, each of the cracking heads 1 is attached to and driven by a roller chain 7 attached to the upper portions of the brackets 6 and a cooperating separator (not shown) may be releasably attached to a downwardly extending portion 8 of each mounting bracket 6.

As the roller chain 7 is continuously driven around its closed path, it carries the cracking heads 1 through the several operating areas. The functioning of the improved cracking heads 1 will now be described in greater detail.

THE IMPROVED EGG CRACKING HEAD

The preferred embodiment of the improved cracking head will now be described with reference to the figures. Each of the cracking heads 1 has a pair of adjacent egg support arms 9 pivotally mounted with respect to each other on an elongated pivot pin 10. The support arms 9 are attached to the pin by means of spaced hinge members 11. The outer ends of both support arms 9 are formed with a generally concave egg support surface 12 for receiving and supporting the eggs 13 during the cracking and draining operations. The elongated pivot pin 10 also serves to releasably mount each of the cracking heads 1 on upwardly extending spaced flanges 14 on the mounting brackets 6. A compressed coil spring 15 holds each cracking head 1 in place by urging the cracking head 1 toward the opposite flange 14 and permits the cracking head 1 to be removed when the pivot pin 10 is pushed to the left (FIG. 1) against the force of the coil spring 15. The eggs 13 are held in position in the cracking head 1 by a hold-down arm 16 preferably having a resilient shallow cup-shaped egg gripping pad 17 at its outer end. The pad 17 is urged downwardly against the egg 13 by a coil spring 18 positioned at the pivot connection 19 between the hold-down arm 16 and the arm support member 20.

A cam follower 29 is attached to the outer end of the hold-down arm 16 which engages an opening cam 21 (FIG. 1) as each cracking head 1 moves through an egg loading area at an egg feeder.

An egg cracking knife 22 is pivotally mounted at 23 on each of the support arms 9. Coil springs 24 at the pivotal mountings 23 urge each of the knives 22 to turn towards their egg cracking positions as controlled by adjustable stops 25. Low friction cam followers 26 on the upper portions 27 of the knives 22 are positioned to engage a suitable knife positioning cam 28 on the machine as shown in FIG. 1. The terminal end of the cam 28 is shaped to first cock the knives 22 by swinging them away from the eggs 13 and to then permit the knives 22 to move sharply against and into the eggs 13 when the cam 28 terminates and releases the knives 22 at the egg cracking position.

FIG. 1 illustrates a preferred mounting position for the cracking knives 22. The knives 22 are shaped and positioned with respect to their pivot connections 23, the knife stops 25, and the control cam 28 so that the cracking edges of the knives 22 are at about a 45° angle with the horizontal as the knives engage and pass into the egg shells. As already illustrated in FIGS. 1 and 6, this places the lowermost portions of the cracking edges of the knives 22 which engage the egg shells at or slightly to the left of the lowermost portions of the cracked egg shells. This permits a rapid and full drainage of the egg shells as the egg white and the egg yolk flow freely from the shell over open and lowermost portions of the cracked shells.

At the same time, the halves of the cracked eggs 13 are firmly held in position during the cracking and at the subsequent open or drainage positions of the cracking head by the gripping pad 17 and the substantial portions of the knives 22 remaining in contact with the halves of the egg shells.

As already noted, the egg cracking heads 1 are usually moving around closed paths in a generally horizontal plane which subjects the liquid egg white 30 and egg yolk 31 to centrifugal forces in a direction outwardly away from the cracking knives 22. This further facilitates a rapid drainage of the egg white 30 from the lower and outer portions of the shell halves and also tends to facilitate the drainage of the egg yolks 31 without fracture as the yolks 31 also tend to flow and drain out of the egg shells away from the knives 22.

The angular and inner positioning of the cracking knives 22 described above has an added advantage in controlling the penetration of the cracking knives 22 into the eggs 13 in accordance with the egg size. This is illustrated in diagrammatic FIG. 6. As seen in FIG. 6, a horizontal knife 22A will penetrate the same distance into the cracked egg regardless of the egg size. The angularly mounted knives 22 in accordance with the present invention are seen to penetrate decreasing distances for decreasing egg sizes.

Measurements for normal jumbo size eggs, which are about 1⅞" in diameter, show a penetration of about ¼". For medium size eggs of about 1 9/16" in diameter, there is a lesser knife penetration of only about 3/16". Small or peewee eggs, which have a normal diameter of about 1¼" have a penetration of only about ⅛". This limits knife penetration generally in accordance with egg size and protects the yolks of the smaller eggs from being ruptured by the knives.

Even though the amount of penetration varies for differing egg sizes, it has been observed that the arcuate cut for each of the three sizes is adequate for each cracking and is about 25% of the egg circumference.

After the cracking knives 22 have been released so that they penetrate the egg in the manner described above, the cracking head 1 is swung open about the pivot pin 10 by cams acting on the cam followers 33 and 34 on the inner ends of the support arms 9.

In FIG. 3, a closing cam 35 is illustrated exerting a downward force on the two cam followers 33 and 34 to keep the cracking head 1 closed with the knives 22 adjacent to one another.

FIG. 4 shows the cracking head 1 moved to its fully opened drainage position by a draining cam 32 mounted on the egg breaking machine which forces the cam followers 33 and 34 upwardly so that the support arms 9 move away from each other about the pivot pin 10. Each of the knives 22 swings outwardly with the support arm 9 to which it is attached and remains in engagement with the rearward portion of the egg shell. The knives 22 together with the gripping pad 17 maintain the halves of the eggs firmly in position for drainage. The knife position on the cracked eggs together with the centrifugal force of the moving cracking heads 1 drains the yolks and the egg whites generally forwardly of the knives 22 and downwardly into a suitable receptacle or separator means.

The above described knife arrangement may be used with a two-position cracking head having the closed and opened positions already described and it is also useful with a three-position cracking head. The third position may be used as the cracking heads are carried beyond the initial draining station to permit a full and complete receover of the egg white from the egg halves. During this period, it is not necessary to keep the cracking heads at their fully opened positions and accordingly the support arms are moved closer together to the position illustrated in FIG. 5 where the egg halves are more securely held in position by the continued locking action of the support arms 9, the knives 22, and the gripping pads 17. This partially opened position may be obtained by a suitably positioned cam which holds the cracking heads opened against the closing force of the head closing springs 36 or it may be obtained without the use of a cam by positioning the closing spring 36 above the center line of the pivot pin 10 so that the support arms 9 are held in the partially opened position with the spring 36 resting against a positioning bar 37 on the support member 20. The cracking heads will remain in this partially opened drainage position until closed by the closing cam 35 of FIG. 3.

It will be seen that an improvement has been described for use on egg breaking machines which provides a cracking head with an improved knife position control for better egg white drainage and yolk protection. This improvement is provided with a minimal amount of structure and may be used to improve existing machines.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In an egg cracking head for an egg breaking machine having a pair of egg supports including outer egg holding end portions and means for pivotally attaching said supports for hinged movement and with an egg cracking knife pivotally attached to each support at facing edges thereof and having a generally straight cracking edge the improvement comprising means for positioning said knives for movement between a first cocking position spaced from an egg held in said end portions and a second egg cracking position with the said cracking edges of the knives penetrating the egg and extending inwardly and upwardly from a point adjacent to where a vertical center line crosses the bottom of the egg shell and with said cracking edges being positioned at an acute angle to the said center line whereby a lowermost portion of the cracked egg shell is exposed for drainage.

2. In an egg breaking machine having a plurality of egg breaking heads mounted on a carrier for movement around a generally horizontal and at least partially closed path with the egg breaking heads each having a pair of egg supports including outer egg holding end portions and means for pivotally attaching said supports for hinged movement and with an egg cracking knife pivotally attached to each support at facing edges thereof and having a generally straight cracking edge the improvement comprising means for positioning said knives for movement between a first cocking position spaced from an egg held in said end portions and a second egg cracking position with the cracking edges of the knives penetrating the egg and extending inwardly of said supports and said path and upwardly from the bottom portion of the egg from a point adjacent to where a vertical center line crosses the bottom of the egg shell and with said cracking edges being positioned at an acute angle to the said center line whereby a lowermost portion of the cracked egg shell is exposed for drainage.

* * * * *